United States Patent [19]

Chandler et al.

[11] Patent Number: 4,651,170
[45] Date of Patent: Mar. 17, 1987

[54] LASER PRINTER HAVING MEANS FOR CHANGING THE OUTPUT-IMAGE SIZE

[75] Inventors: Jasper S. Chandler; David Kessler; Edward Muka, all of Rochester, N.Y.

[73] Assignee: Eastman Kodak Company, Rochester, N.Y.

[21] Appl. No.: 719,092

[22] Filed: Apr. 2, 1985

[51] Int. Cl.$^4$ .............................................. G01D 9/42
[52] U.S. Cl. ..................... 346/108; 350/320; 350/6.8; 355/56
[58] Field of Search .................... 346/1.1, 107 R, 108, 346/160; 358/293, 296, 300, 302; 350/320, 6.8; 355/44, 45, 54, 55, 56, 57

[56] References Cited

U.S. PATENT DOCUMENTS

| | | |
|---|---|---|
| 3,603,727 | 9/1971 | Kinugawa et al. |
| 3,657,471 | 4/1972 | Sasabe et al. .................. 346/109 |
| 3,746,447 | 7/1973 | Smith ............................ 355/84 |
| 4,040,096 | 8/1977 | Starkweather ................. 358/302 |
| 4,129,377 | 12/1978 | Miyamoto .................... 355/55 |
| 4,169,275 | 9/1979 | Gunning ....................... 358/300 |
| 4,205,350 | 5/1980 | Gunning ....................... 358/296 |
| 4,247,160 | 1/1981 | Brueggemann ................ 350/6.8 |
| 4,264,120 | 4/1981 | Uchiyama et al. ............. 350/6.8 |
| 4,279,002 | 7/1981 | Rider ............................ 358/300 |

FOREIGN PATENT DOCUMENTS 59-87442  5/1984  Japan ..................... 355/56

*Primary Examiner*—E. A. Goldberg
*Assistant Examiner*—Mark Reinhart
*Attorney, Agent, or Firm*—Raymond L. Owens

[57] ABSTRACT

A laser printer is disclosed which uses a rotating polygon and a cylindrical mirror disposed between the polygon and an image zone. The cylindrical mirror corrects for pyramidal errors in an output image formed on a moving photosensitive member disposed at the image zone by making the operative polygon facet and the image zone optically conjugate in the page scan direction. To change the length of the image in the line scan direction at the image zone, the distance between the polygon and image zone is varied. This is accomplished by moving the cylindrical mirror or by positioning a different cylindrical mirror at a new optical path position. The velocity of the photosensitive member is adjusted to change the length of the output image in the page scan direction. The tilt angle of the cylindrical mirror moved to the new optical path position is changed or the cylindrical mirror is removed from the path and a different cylindrical mirror is inserted at a new optical path position. In either case, at the new image format size, the cylindrical mirror makes the operative polygon facet optically conjugate with the image zone in the page scan direction to correct for pyramidal errors.

Anamorphic beam shaping optics are provided which preceed the polygon to form and position the line scan waist so that it is adjacent to the image zone at different line scan lengths, and to change the beam size at the polygon in the page scan direction at different page scan lengths.

15 Claims, 3 Drawing Figures

LASER PRINTER HAVING MEANS FOR CHANGING THE OUTPUT-IMAGE SIZE

FIELD OF THE INVENTION

The present invention relates to method and apparatus for changing output image sizes in laser printers which use multi-faceted rotating polygons.

BACKGROUND OF THE INVENTION

Many optical printers use a laser scanning process. The intensity of a laser light beam focused on a two-dimensional photosensitive surface is modulated as the beam is moved relative to such surface to provide a two-dimensional output image at an image zone. In one common system, a rotating multi-faceted polygon is used to line scan a beam of light from the laser across a photosensitive member at the image zone. An acoustooptic modulator intensity modulates the beam in accordance with the gray or brightness level of pixels of a digital image held in a frame store memory. The rotating polygon has the advantages of high generation rates, high resolution and relatively maintenance-free operation.

The mirror facets when assembled will produce artifacts in a recorded image which are known as "banding". It is known that these artifacts are caused by tilt or pyramidal errors in the facets. High quality laser printers commonly incorporate an optical correction system for these pyramidal errors. A cylindrical correcting lens is used in the printer described in U.S. Pat. No. 4,040,096 to Starkweather, issued August, 1977. The lens which is disposed between a polygon and a photosensitive member has power only in one direction (page scan) and no power in a perpendicular direction (line scan). U.S. Pat. No. 4,247,160 to Brueggemann issued January, 1981, discloses a laser polygon printer which has a positive cylindrical mirror disposed between a polygon and a photosensitive member to correct for pyramidal errors. Both these laser printers print only one output image size. The current state of the art in laser color printing is to employ a constantly rotating polygon scanner which scans a fixed line length and uses a fixed number of pixels. The page length is also fixed. In another printer, the line scan length is adjusted by varying timing of the information modulation of the laser beam without adjusting any of the printer's optical elements or the angular velocity of the polygon. The page scan dimension is changed by adjusting the velocity of the photosensitive member. In another example, to reduce the line scan length by one-half, without changing sampling time, the numerical value of every other digital image pixel of a line in frame store memory has been used to information modulate the beam. Since only one-half of the digital pixels are used, this process results in a significant loss of information in the output image. This is particularly unsatisfactory if colored prints are to be made. If optical means are used to change the line scan length, then drastic changes have to be made to the optical system. Also, provision should be made for pyramidal error correction at the different output image sizes.

SUMMARY OF THE INVENTION

The object of the invention is to change line scan length by optical means without loss of information in the output image produced by a polygon laser printer while still preserving pyramidal error correction.

This object is achieved by a multi-image format laser printer which includes a rotating polygon having mirror facets for line scanning a beam of light across an image zone to form an output image at such zone, optical means disposed between the polygon and the image zone for optically conjugating in the page scan direction the operative mirror facet with the image zone to thereby correct for pyramidal errors, means for modifying the optical means for varying the length of a line scan at the image zone and for correcting for pyramidal errors at different line scan lengths by maintaining the optical conjugation between the operative polygon facet with the image zone in the page scan direction.

The optical means includes a cylindrical mirror positioned to make the operative polygon facet optically conjugate with the image zone in the page scan direction to provide for pyramidal error correction. The output image size, is adjusted by changing the dimensions of an output image in line and page scan directions. The line scan length is changed by altering the distance between the polygon and the photosensitive member by moving the cylindrical mirror to a new optical path position or by inserting a different cylindrical mirror at a new optical path position. The page scan dimension is adjusted by changing the velocity of the photosensitive member. To correct for pyramidal errors at the new output image size, the cylindrical mirror which was moved to a new optical path position has its tilt angle changed or it is removed from the optical path and a different cylindrical mirror is inserted into the optical path. In either case, the operative polygon facet and the image zone are maintained optically conjugate in the page scan direction. Pyramidal error correction is thereby provided for the new output image size.

Each time the cylindrical mirror is moved, changes are made in anamorphic beam shaping optics preceeding the polygon to form the beam waist in the line scan direction adjacent to the image zone.

An advantage of this invention is that substantial changes to a laser printer's optical system do not have to be made to change the output image size, while still providing pyramidal error correction. Printers made in accordance with this invention are especially suitable for making colored prints.

DESCRIPTION OF THE PREFERRED EMBODIMENT

As used herein, the terms "anamorphic" and "astigmatic" are interchangeable. They generally refer to a gaussian laser light beam which is compressed or expanded along one direction relative to the perpendicular direction. The term "image size" refers to the area of a two-dimensional output image at an image zone.

Figure 1:
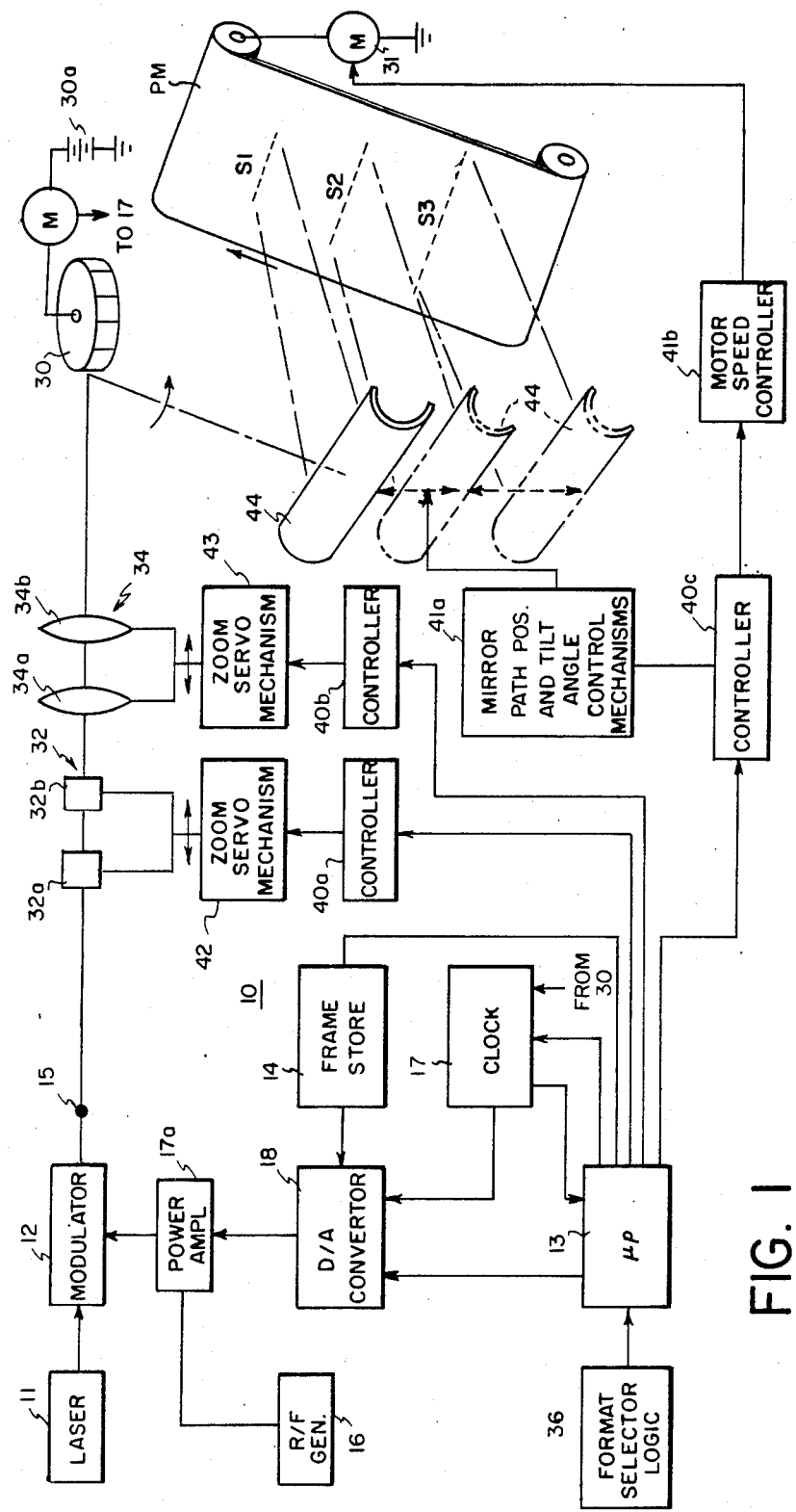
FIG. 1 is a diagram, partially in block and partially in schematic form, of a laser printer embodying apparatus for changing the output image format size.

In FIG. 1, there is shown a laser printer 10 which includes at least one laser 11 for producing a beam of gaussian light, and a modulator 12. We will first discuss the general organization of the laser printer 10. The laser beam is information modulated or discretized in brightness by the modulator 12 which may for example be a single beam acoustooptic modulator. Modulator 12 may include a transparent cell which is made of an acoustooptic material such as glass or $TeO_2$ crystal and a piezoelectric transducer bonded to the cell. A radio frequency (R/F) signal is produced by an R/F generator 16. This signal at a predetermined frequency, usually in the range of 40–300 MHz, is applied to the transducer by way of a power amplifier 17a. The power amplifier scales the amplitude of the R/F signal. The transducer launches acoustic waves in the cell which produce sonic compression waves that create a diffraction wave grating.

This diffraction grating causes a portion of the input laser light beam passing through the cell to be diffracted out of its original path. Amplitude changes of the RF signal caused by the power amplifier 17a cause intensity modulation of the diffracted (first-order) and undiffracted (zero-order) beams. The intensity of the modulated diffracted light beam varies in response to RF signal amplitude. The modulated diffracted light beam, rather than the undiffracted beam, is utilized, e.g. applied to a deflector which, as will be discussed shortly, is a polygon that converts the modulated light beam into a line scan.

A microprocessor ($\mu$p) 13 in response to a clock signal produced by a clock 17 provides a signal to a frame store memory 14 which periodically causes the gray or brightness digital level of pixels of a digital image stored in the frame store memory 14 to be applied to a D/A converter 18. Converter 18 provides control signals to power amplifier 17a. The power amplifier 17a adjusts the amplitude level of the RF signal in response to the analog signal representative of the brightness of a pixel produced by D/A converter 18. The timing of the operation of the D/A converter 18 is provided by a clock signal from clock 17. This arrangement produces a modulated circularly symmetrical beam of gaussian light at position 15. The digital image can be provided in a number of ways such as by scanning a beam of light through a negative onto a photodetector which provides outputs representative of the gray or brightness level of image pixels. These levels are digitized and stored in frame store memory 14.

A scanning polygon 30 has a plurality of mirror facets. The operative facet deflects the modulated light beam and line scans it across a photosensitive member PM located at an image zone. Preferably, the polygon 30 is driven at a constant angular velocity by a motor 30a. The polygon 30 can be mounted on an air spindle. The polygon 30 drives a shaft encoder (not shown) which provides an input signal to the clock 17 representative of the beam position in the line scan. In response to this input signal and a signal produced by the microprocessor 13, the clock 17 is turned on and off as a function of the desired line scan length. The line scan length is selected by an operator and provided as an input to selector logic 36. The periodicity of the clock signal is adjusted as a function of the line scan length. For example, with shorter line scan lengths, the frequency of the clock signal is increased to have the same number of pixels per line.

As the beam is line scanned by an operative one of the mirror facets of the polygon 30, the beam forms an output image on the photosensitive member PM. The term "photosensitive member" will be understood to include a photographic film, photographic paper, a photoconductor used in a copier/duplicator and any other means responsive to a source of light to produce a visible output image. The elements of this output image are also called pixels. The member PM is continuously driven in the page scan direction by a variable speed DC motor 31. The beam is line scanned at a much higher speed than the speed of the photosensitive member. Alternatively, the photosensitive member PM can be held stationary during line scans and incrementally moved in the page scan direction between line scans. It will be understood that the light beam need not be monochromatic but can also be polychromatic if the apparatus is to produce colored prints. The operation of polygons, lasers, optics, and modulators are well understood in the art. For a more complete description of their operations, see Urbach et al, "Laser Scanning for Electronic Printing", Proceedings of the IEEE, 597 (June, 1982).

In operation, to change the line scan length, a cylindrical mirror is moved to a new position and its tilt angle is changed to provide for pyramidal error correction. The dimension in the page scan is changed by adjusting the velocity of the photosensitive member PM. No changes are made to the angular velocity of the polygon 30. Anamorphic beam shaping optics preceeding the polygon are adjusted each time the cylindrical mirror is moved to provide a substantially circularly symmetrical beam at the image zone.

In the laser printer 10, between position 15 and the polygon 30, there are two anamorphic beam shaping zoom lens systems 32 and 34 respectively. Each of these zoom lens systems has two cylindrical lenses. Zoom lens system 32 has cylindrical lenses 32a and 32b. Zoom lens system 34 has cylindrical lenses 34a and 34b. The line scan zoom lens system 34 is positioned at all image format sizes to shape the circularly symmetrical beam (at position 15) so that the beam's waist in the line scan direction is always near or adjacent to the image zone. The page scan zoom lens system 32 shapes the beam so that at all image format sizes the beam's waist in the page scan direction is formed near or adjacent to the operative polygon facet. Since no optical magnification power exists in the line scan direction between the reflective mirror facets on the polygon or a cylindrical mirror 44 and the photosensitive member PM, the beam size (spot size) in the line scan direction at the image zone is adjustable only by zoom lens system 34. Lens system 32 in combination with the concave cylindrical mirror 44, adjusts the beam size (spot size) in the page scan direction at the image zone so that the beam spot of the light incident on the photosensitive member PM is substantially circularly symmetrical. Exact circular symmetry may not be necessary to provide acceptable image quality.

The cylindrical mirror 44 also provides pyramidal error correction as will be described later. The beam spot size is adjusted for each output image size. At any given output image size, it is highly desirable that the beam spot size be maintained sufficiently constant as it is line scanned at the image zone to provide a high modulation transfer function (MTF) for sharp prints. In the line scan direction, this does not create a problem if the beam's waist is kept adjacent to the image zone. For laser printers of the type described using up to about 1500 spots in scan line lengths of about 100 mm, once the zoom lens system 32 has been positioned, there is a very small spot size change of the beam along the length of the line scan at the image zone. The spot size change that does occur will not significantly alter the line scan MTF.

In order to change the output image size, an operator provides an input into the format selector logic 36. Logic 36 provides a digital input to a microprocessor 13 which provides control signals to the frame store 14, the clock 17, and controllers 40a, 40b and 40c. Controllers 40a and 40b respectively control the zoom lens systems 32 and 34 using drive zoom servo mechanisms 42 and 43 respectively. Controller 40c controls mirror path position and tilt angle control mechanisms 41a and a motor speed controller 41b. Control mechanisms 41a control the cylindrical mirror 44 path position and tilt angle. Controller 41b controls the page scan drive mechanism that moves the photosensitive member PM.

Both mechanisms 42 and 43 will be understood to include two separate adjustment devices. The first adjustment device moves both the cylindrical lenses as a unit to a new position along the optical path and the second adjustment mechanism controls the spacing between the lenses. For example, as discussed above, zoom lens system 34 is adjusted by mechanism 42 to shape the beam to form a beam waist in the line scan direction adjacent to member PM for each different output image format size. If, for example, the distance between the polygon 30 and the photosensitive member PM is increased by moving mirror 44 from position $A_1$, to position $A_2$ or $A_3$, controller 40b will provide an input signal to mechanism 43 which moves both lenses 34a and 34b to a new path position closer to position 15 and then adjusts the spacing between these lenses. In its new position, zoom lens system 34 changes the beam spot size in the line scan direction. The mirror 44 in a new path position, varies the beam spot size in the page scan direction at the image zone. To shape the page scan spot size, the controller 40a repositions the zoom lens system 32 to shape the beam so that a generally circularly symmetric beam spot is provided at the image zone. In general, the larger the output image size, the larger the desired spot size.

Figure 2:
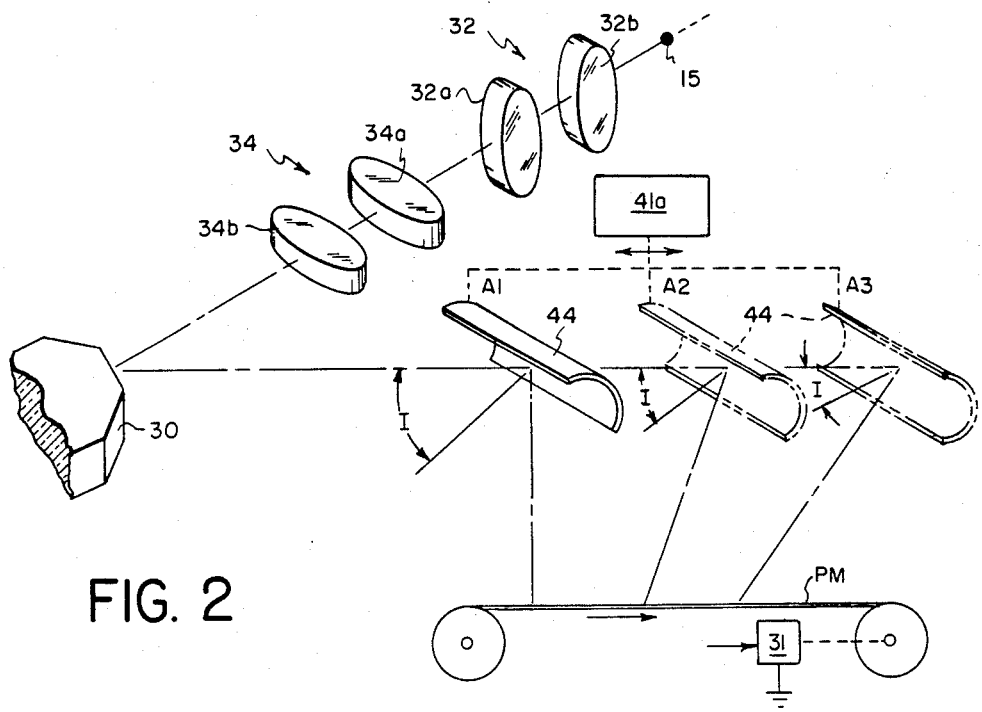
FIG. 2 shows a side perspective of the laser printer of FIG. 1.

To change the page scan length, the controller 40c, in response to signals from the microprocessor 13, also provides control signals to motor speed controller 41b. Controller 41b adjusts the velocity of variable speed motor 31 and thereby changes the output image page scan dimension. When the mirror 44 is at position $A_1$, as shown in FIG. 2, the line scan has a length $S_1$. The member PM is continuously driven in the page scan direction at a constant velocity proportional to the applied voltage by motor 31 as the laser beam is line scanned by the polygon 30.

When the mirror 44 is moved for example from position $A_1$ to position $A_2$, (the line scan length is shown as $S_2$, where $S_2$ is greater than $S_1$), the controller 41b applies a higher voltage across motor 31. The velocity of the motor 31 is increased. Similarly at position $A_3$, where the line scan is at a length $S_3$ (its greatest length), the highest voltage is applied across motor 31. Motor 31 drives the photosensitive member PM at its highest velocity.

Each facet mirror on the polygon 30 when not perfectly assembled can have a tilt or pyramidal angle error which causes pixel position error in the page scan direction to be introduced into a light beam at the image zone. Artifacts produced in the image which are a result of pyramidal errors are known as "banding". The cylindrical mirror 44 (with power in only the page scan direction) makes optically conjugate the operative polygon facet and the image zone. In other words, mirror 44 forms an image of the operative facet of polygon 30 at the image zone in the page scan direction. This conjugation process corrects for pyramidal errors.

For a more complete discussion of polygon pyramidal errors and the theory behind their correction, see the above-referred to article in the Proceedings of the IEEE by Urbach et al.

A cylindrical mirror is preferable to a cylindrical lens if a polychromic beam is used, since a mirror optically relays an image of the beam on the operative polygon facet mirror to the member PM at all line scan angles and at multiple wavelengths without introducing refraction errors.

The distance the image zone is from the polygon is directly related to the length of the line scan. This distance can readily be changed by positioning cylindrical mirror 44 in accordance with equation (1). More specifically, the distance ($L_1+L_2$) from the polygon to the image zone where member PM is located is given by the equation:

$$L_1 + L_2 = \frac{S/\text{Tan}(\text{Alpha})}{2} \tag{1}$$

where $L_1$ is the distance along the center line of the optical axis between polygon 30 and mirror 44;

$L_2$ is the distance along the center line of the optical axis between mirror 44 and member PM;

S is the length of a scanned line at the image zone; and

Alpha is the half field angle which is determined by the polygon duty cycle.

Once the mirror 44 is moved to change the line scan, then changes must be made to at least one mirror parameter to continue to correct for pyramidal errors. More specifically, the operative facet of the polygon 30 and the image zone must again be made conjugate. The following is a mathematical statement of the relationship which produces this conjugation:

$$\frac{1}{L_1} + \frac{1}{L_2} = \frac{2}{R \cos(I)} \tag{2}$$

where

R is the radius of curvature of mirror 44;

I is the tilt angle of the mirror 44 which is the angle between where the center line of the light beam contacts the mirror surface and a normal engages the mirror surface at such point of contact; and $L_1$ and $L_2$ are as defined above.

As noted above, it is desirable that the zoom lens system 34 "zoom" the line scan beam waist so it is adjacent to the image zone for constant MTF considerations. In the embodiment shown in FIGS. 1 and 2, since the radius R is fixed, only the tilt angle I can be adjusted. As illustrated in FIG. 2, by decreasing the tilt angle I of the cylindrical mirror 44, the relationship of equation (1) can be satisfied at longer distances ($L_1+L_2$). The microprocessor 13 provides appropriate control signals to controller 40c which positions the mirror 44 and adjusts its tilt angle I to satisfy equation (1). As discussed above, at larger output image sizes, the velocity of the member PM must be increased in the page scan direction because of longer line scan lengths. This adjustment is made by motor speed controller 41b.

While the operative polygon mirror facet must be optically conjugate with the image zone, the optical magnification or power need not be unity. Stated another way the spot size of the beam on the facet may be larger than the spot size of the beam on the photosensitive member. In fact, it is desirable to have an optical magnification of less than unity to minimize the effect on the beam of any surface defects in the polygon facet mirrors.

The line scan length is changed by altering the distance between the polygon and the photosensitive member PM by moving the cylindrical mirror to a new optical path position. Also, by properly selecting tilt angle I to satisfy equation (2), the cylindrical mirror 44, in the page scan direction, optically conjugates the polygon facet mirror with the image zone and corrects for pyramidal errors. The combination of the zoom lens systems 32, 34, polygon 30 and cylindrical mirror 44 shape the beam so that it has the appropriate size at the image zone. The result of this process is to make the image zone optically conjugate with position 15.

The following is a specific example with two image formats, one with scan length of 4 inches and the other with scan length of 5 inches. The cylindrical mirror 44 radius R is 92.2 mm. In scan line direction the beam waists are 0.04 and 0.05 mm radius ($e^{-2}$) and they are located 2 mm and 2.5 mm into the photosensitive member PM. At position 15 the beam radius is 0.05 mm. The wavelength is 0.633 microns. The scan direction beam shaper or zoom system has two cylindrical lenses. Lens 34a with focal distance of −62.7 mm and 34b with focal distance of 175 mm. The distances from position 15 to lens 34a for the two formats are 31.55 and 60.81 mm, the distances from lens 34a to 34b are for the two formats 296.6 and 231.8 and the distance from lens 34b and the image drum are 389.8 and 524.2 mm.

In the page direction there are provided two cylindrical lenses 32a with focal distance of 50 mm and 32b with focal distance of 200 mm. The distances from position 15 to lens 32a for the two formats are 44.75 and 43.47 mm, between 32a and 32b 175.9 and 115.9 mm, and between lens 32b and the polygon 30, the distances are 299.4 and 360.7 mm. The distances from the polygon to the cylindrical mirror 44 are 159.6 and 182.2 mm, the tilt angles I of the mirror are 46.25° and 33.94°. The distances from mirror 44 to the drum are 39.9 and 33.94 mm. In this example, the photosensitive member was in the form of a drum. The drum radius is 53.7 mm and the beams incidence angles onto the drum in the page direction are 90°. At the drum, the beam radii in the page direction are 0.059 and 0.074 mm respectively. For two or more formats the line direction zoom lens system may consist of three lenses.

Figure 3:
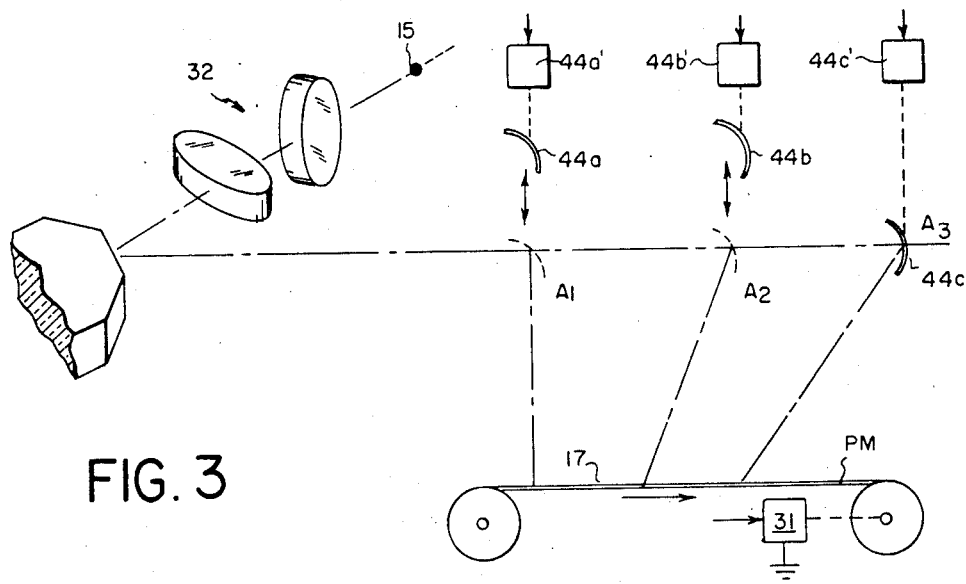
FIG. 3 shows a side perspective of a laser printer embodying another apparatus for changing output image size.

FIG. 3 shows an embodiment similar to that in FIGS. 1 and 2, except that cylindrical mirrors 44a, 44b and 44c are selectively moved into and out of the optical path of the laser beam. In operation, one of the solenoids 44a', 44b' and 44c' is energized by controller 40c and moves its mirror 44 into the optical path. At this time the other solenoids are energized in an opposite sense by controller 40c to withdraw their mirrors from the optical path. By careful selection of R and I parameters to satisfy equation (2) which not only provide pyramidal correction but also provide the desired magnification in the page scan direction at the image zone, the need for a page scan zoom lens system can be obviated. Each one of the three different mirrors 44a, 44b, is used in providing a different output image size. Each cylindrical mirror has a different radius R and a different tilt angle I.

For an example of the FIG. 3 embodiment, we will use the same input and output conditions as in the previous example. Also the same lenses 34 are used and the position of lenses 32 are fixed at their locations for the 4 inch format. Two different mirrors 44, one with radius of 83.1 mm and the other with radius of 117.5 mm are employed. The distances from the polygon 30 to the mirrors 44 are 158.3 and 226.1 mm respectively, and the tilt angles l of these mirrors are 40.34° and 23.62° respectively. The distances from mirror 44 to the photosensitive member are 39.6 and 70.6 mm respectively. In this example, the photosensitive member PM was in the form of a drum. The drum radius is 50.8 mm and the beams incidence angles onto the drum a in the page direction are 90°. At the drum, the beam radii in the page scan direction are 0.059 and 0.074 mm respectively.

We claim:

1. In a multi-image format laser printer which includes a rotating polygon having mirror facets for line scanning a beam of light across an image zone to form an output image at such zone, the improvement comprising: optical means disposed between the polygon and the image zone for optically conjugating in the page scan direction the operative mirror facet with the image zone to thereby correct for pyramidal errors, means for modifying the optical means for varying the length of a line scan at the image zone and for correcting for pyramidal errors at different line scan lengths by maintaining the optical conjugation between the operative polygon facet with the image zone in the page scan direction.

2. The invention as set forth in claim 1, including beam shaping means preceeding the polygon for forming a beam waist in a line scan direction at the new format size and positioning such beam waist adjacent to the image zone.

3. The invention as set forth in claim 1, wherein said optical means includes a cylindrical mirror with optical power in the page scan direction, and said modifying means includes means for moving said cylindrical mirror along the optical path to a new path position and means for changing the tilt angle of said cylindrical mirror at the new path position to continue to correct for pyramidal errors.

4. The invention as set forth in claim 1, wherein said optical means includes at least two cylindrical mirrors with different radius of curvatures and tilt angles, and said modifying means includes means for selectively inserting only a particular one of the cylindrical mirrors into the optical path of the beam.

5. The invention as set forth in claim 2, wherein said beam shaping means includes a zoom lens system having two cylindrical lenses with power in only the line scan direction.

6. In a laser printer including a rotating polygon having mirror facets for line scanning a beam of gaussian laser light across a moving photosensitive member at an image zone, and cylindrical mirror means disposed between the polygon and the image plane to provide pyramidal error correction by making optically conjugate in the page scan direction, the operative polygon facet and the image zone; apparatus for changing the output image size on the photosensitive member comprising:

(a) adjustable beam shaping means for forming in the line scan direction a beam waist and positioning such beam waist at the new output image size adjacent to the image zone;

(b) means for changing the velocity of the photosensitive member when the output image size is changed; and (c) adjusting means for changing the distance between the polygon and the image zone, by positioning the cylindrical mirror means to thereby change the length of a line scan and for changing at least one parameter of such cylindrical mirror means to correct for pyramidal errors at the new output image size by maintaining the optical conjugation between the operative polygon facet and the image zone in the page scan direction.

7. The invention as set forth in claim 6, wherein said cylindrical mirror means includes a single cylindrical mirror and said adjusting means includes means for positioning said single cylindrical mirror along the optical path and for changing the tilt angle of said single cylindrical mirror to continue to provide pyramidal error correction.

8. The invention as set forth in claim 6, wherein said cylindrical mirror means includes at least two cylindrical mirrors and said adjusting means includes means for selectively inserting only a particular one of the cylindrical mirrors into the optical path of the beam.

9. The invention as set forth in claim 6, wherein said adjustable beam shaping means includes a zoom lens system having two cylindrical lenses with optical power in only the line scan direction.

10. In a laser printer including a rotating polygon having mirror facets for line scanning a beam of gaussian laser light across a photosensitive member at an image zone, and cylindrical mirror means disposed between the polygon and the image plane for providing pyramidal error correction by making optically conjugate in the page scan direction, the operative polygon facet and the image zone, apparatus for changing the line scan length on the photosensitive member comprising:

(a) adjusting means for changing the distance between the polygon and the image zone, by positioning the cylindrical mirror means to thereby change the length of a line scan and for changing at least one parameter of such cylindrical mirror means to correct for pyramidal errors at the new line scan length by maintaining the optical conjugation between the operative polygon facet and the image zone in the page scan direction; and (b) adjustable beam shaping means for forming in the line scan direction a beam waist and positioning such beam waist at the new line scan length adjacent to the image zone.

11. The invention as set forth in claim 10, wherein said cylindrical mirror means includes a single cylindrical mirror and said adjusting means includes means for positioning said single cylindrical mirror along the optical path and for changing the tilt angle of said single cylindrical mirror to provide pyramidal error correction.

12. The invention as set forth in claim 10, wherein said cylindrical mirror means includes at least two cylindrical mirrors and said adjusting means includes means for selectively inserting only a particular one of the cylindrical mirrors into the optical path of the beam.

13. The invention as set forth in claim 10, wherein said adjustable beam shaping means includes a zoom lens system having two cylindrical lenses with optical power in only the line scan direction.

14. A method for changing the format size of an output image produced by a modulated gaussian beam of laser light which is line scanned by a polygon across an image zone, comprising the steps of:

(a) changing the length of line scan at the image zone;
(b) adjusting the spacing between line scans;
(c) correcting for pyramidal error at the new format size;
(d) adjusting beam size and waist location in the line scan direction; and
(e) adjusting beam size in the page scan direction.

15. In a laser printer having a memory for storing a digital image formed of pixels representing brightness levels, a constantly rotating polygon for line scanning a beam of laser light across an image zone the combination comprising adjustable means for periodically intensity modulating said light beam in accordance with the stored pixel brightness levels, the modulation periodicity as a function of the line scan length at the image zone, optical means providing pyramidal correction in first and second states, said optical means being effective in said first state for producing a first beam spot size at the image zone which produces a sharp image at the image zone for a first line scan length, and effective in said second state for producing a second beam spot size at the image zone which produces a sharp image at the image zone for a second line scan length.

* * * * *